(12) United States Patent
Lee et al.

(10) Patent No.: US 11,847,001 B2
(45) Date of Patent: Dec. 19, 2023

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Won Hee Lee, Incheon (KR); Young Ju Kim, Gyeonggi-do (KR); Yun Seok Oh, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 111 days.

(21) Appl. No.: 17/577,723

(22) Filed: Jan. 18, 2022

(65) Prior Publication Data
US 2022/0229472 A1 Jul. 21, 2022

(30) Foreign Application Priority Data

Jan. 18, 2021 (KR) .................. 10-2021-0006774

(51) Int. Cl.
*H01Q 1/38* (2006.01)
*G06F 1/16* (2006.01)
*H01Q 1/22* (2006.01)

(52) U.S. Cl.
CPC ......... *G06F 1/1698* (2013.01); *H01Q 1/2266* (2013.01); *H01Q 1/38* (2013.01)

(58) Field of Classification Search
CPC ........ H01Q 1/38; H01Q 1/2266; H01Q 1/243; H01Q 5/42; H01Q 21/065; H01Q 1/241; H01Q 1/50; H01Q 1/46; G06F 1/1698; G06F 1/1626; H05K 1/0237; H05K 1/185; H05K 1/189; H05K 2201/10098
See application file for complete search history.

(56) References Cited

U.S. PATENT DOCUMENTS

| | | | |
|---|---|---|---|
| 2015/0255856 A1* | 9/2015 | Hong .................. | H01Q 21/061 343/702 |
| 2020/0295437 A1* | 9/2020 | Ueda ...................... | H01Q 21/20 |
| 2021/0028546 A1* | 1/2021 | Yamada ................. | H01Q 1/243 |

FOREIGN PATENT DOCUMENTS

KR 10-2013-0095451 A 8/2013

* cited by examiner

*Primary Examiner* — David E Lotter
(74) *Attorney, Agent, or Firm* — The PL Law Group, PLLC

(57) ABSTRACT

An antenna package according to an embodiment of the present disclosure includes an antenna device including an antenna unit that includes a first radiator, and an intermediate circuit board coupled to the antenna device to be electrically connected to the antenna unit. The intermediate circuit board includes a core layer, a first feeding wiring formed on one surface of the core layer and electrically connected to the antenna unit, and a second radiator formed on the one surface of the core layer. A radiation coverage is expanded using an antenna included in the intermediate circuit board.

16 Claims, 4 Drawing Sheets

ANTENNA PACKAGE AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2021-0006774 filed on Jan. 18, 2021 in the Korean Intellectual Property Office (KIPO), the entire disclosures of which are incorporated by reference herein.

BACKGROUND

1. Field

The present invention relates to an antenna package and an image display device including the same. More particularly, the present invention relates to an antenna package including an antenna device and a circuit board, and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

However, if a driving frequency of the antenna increases, a signal loss may be increased. Further, as a length of a transmission path increases, an antenna gain may be decreased.

To connect the antenna to, e.g., a main board of the image display device, a connection intermediate structure such as a printed circuit board may be added. In this case, the signal loss may also be increased by the connection intermediate structure.

Additionally, when the antenna is disposed on a front side of the image display device, a radiation direction of the antenna is limited. Thus, a broadband or high coverage antenna radiation may be substantially limited. When the antenna is inserted into an image display device to improve antenna radiation properties, a thickness of the image display device may increase and a radiation interference may occur due to a conductive structure of a display panel.

For example, Korean Published Patent Application No. 2013-0095451 discloses an antenna integrated into a display panel, but does not provide any efficient circuit connection in consideration of the above-described issues.

SUMMARY

According to an aspect of the present invention, there is provided an antenna package having improved radiational property and spatial efficiency.

According to an aspect of the present invention, there is provided an image display device including an antenna package with improved radiational property and spatial efficiency.

(1) An antenna package, including: an antenna device including an antenna unit that includes a first radiator; and an intermediate circuit board coupled to the antenna device to be electrically connected to the antenna unit, the intermediate circuit board including: a core layer; a first feeding wiring formed on one surface of the core layer and electrically connected to the antenna unit; and a second radiator formed on the one surface of the core layer.

(2) The antenna package of the above (1), wherein the intermediate circuit board further includes a second feeding wiring extending from the second radiator on the one surface of the core layer.

(3) The antenna package of the above (2), wherein the intermediate circuit board further includes a third radiator formed on the one surface of the core layer.

(4) The antenna package of the above (3), wherein the intermediate circuit board further includes a third feeding wiring extending from the third radiator on the one surface of the core layer.

(5) The antenna package of the above (4), wherein the core layer has a first region bonded to the antenna device, a second region having a bending region and a third region having an end portion of the intermediate circuit board, and the second radiator is formed on the second region of the core layer, and the third radiator is formed on the third region of the core layer.

(6) The antenna package of the above (5), wherein the second radiator serves as a horizontal radiator with respect to the antenna device, and the third radiator serves as a vertical radiator in a bottom surface direction of the antenna device.

(7) The antenna package of the above (6), wherein the first radiator is a vertical radiator in a top surface direction of the antenna device.

(8) The antenna package of the above (5), wherein the second feeding wiring extends from the second radiator on the second region and the third region, and the third feeding wiring extends from the third radiator on the third region.

(9) The antenna package of the above (5), wherein the first radiator has a different size or a different resonance frequency from that of the second radiator or the third radiator.

(10) The antenna package of the above (9), wherein the first radiator, the second radiator and the third radiator have sizes that sequentially decrease.

(11) The antenna package of the above (9), wherein the first radiator, the second radiator and the third radiator have resonance frequencies that sequentially increase.

(12) The antenna package of the above (5), further including an antenna driving integrated circuit chip electrically connected to the first feeding wiring, the second feeding wiring and the third feed wiring by the third region of the core layer.

(13) The antenna package of the above (5), wherein the first feeding wiring, the second feeding wiring, the third feeding wiring, the second radiator and the third radiator are formed together at the same layer on the one surface of the core layer.

(14) The antenna package of the above (5), wherein the second radiator has a curved shape.

(15) An image display device, including: a display panel; and the antenna package according to embodiments as described above disposed on the display panel.

(16) The image display device of the above (15), further including a chip mounting board disposed under the display panel, and an antenna driving integrated circuit chip mounted on the chip mounting board, wherein the intermediate circuit board of the antenna package is bent under the display panel to be coupled to the chip mounting board and electrically connected to the antenna driving integrated circuit chip.

(17) The image display device of the above (16), wherein the second radiator is disposed on a lateral portion of the display panel.

(18) The image display device of the above (17), wherein the intermediate circuit board further includes a third radiator formed on the one surface of the core layer and disposed under the display panel.

According to embodiments of the present invention, an antenna unit included in an antenna device may be substantially used as an antenna-on-display (AOD) antenna, and an additional antenna unit may be formed on a circuit board connected to the antenna unit. A total antenna gain may be improved through the antenna unit included in the circuit board, and antenna radiation direction or radiation coverage may be extended by a bending of the circuit board.

Accordingly, an antenna package capable of increasing radiation coverage and radiation band while maintaining or improving radiation property and reliability may be provided.

In some embodiments, the antenna unit included in the circuit board may be used as a high-frequency antenna having a higher resonance frequency than that of the AOD antenna to substantially implement a multi-band antenna.

DETAILED DESCRIPTION OF THE EMBODIMENTS

According to exemplary embodiments of the present invention, there is provided an antenna package where an antenna device and a circuit board are combined, and a plurality of antenna units are included. According to exemplary embodiments of the present invention, there is also provided an image display device including the antenna package Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
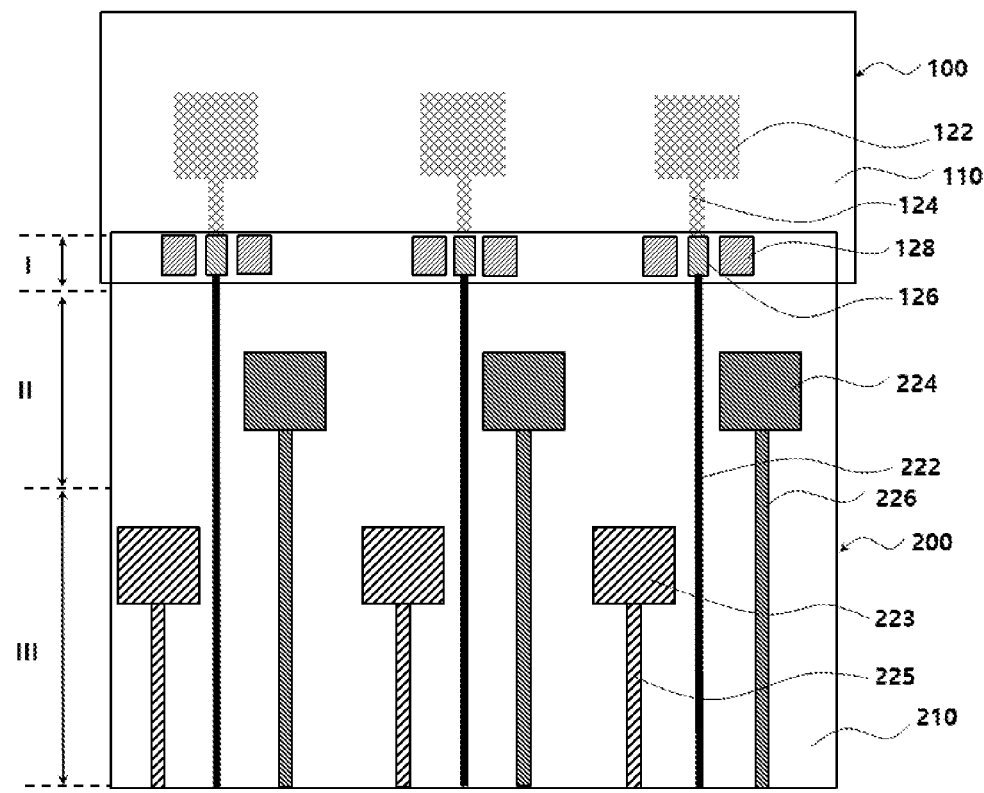
FIG. 1 is a schematic top planar view illustrating an antenna package in accordance with exemplary embodiments.
Figure 2:
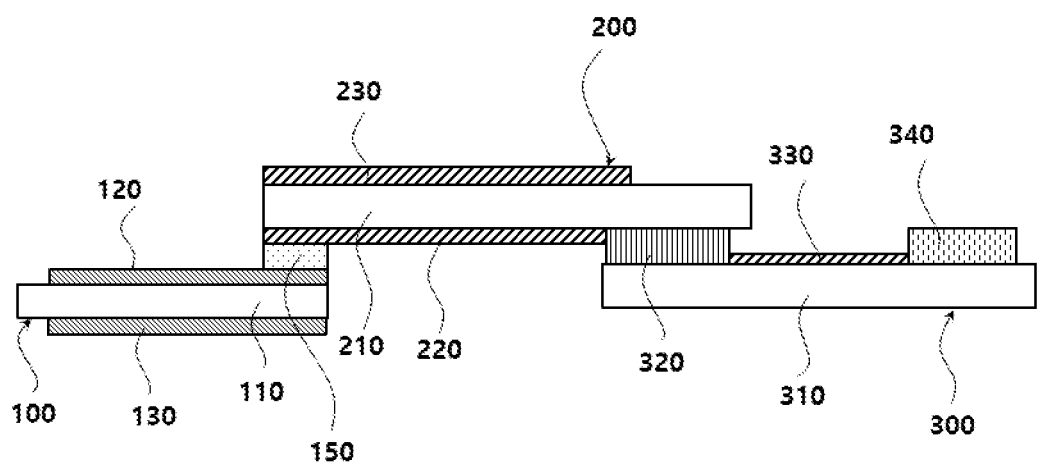
FIG. 2 is a schematic cross-sectional view illustrating an antenna package in accordance with exemplary embodiments.

FIG. 1 is a schematic top planar view illustrating an antenna package in accordance with exemplary embodiments. FIG. 2 is a schematic cross-sectional view illustrating an antenna package in accordance with exemplary embodiments. For example, for convenience of descriptions, an intermediate circuit board is shown in a flat state before being bent in FIGS. 1 and 2.

Referring to FIGS. 1 and 2, the antenna package may include an antenna device 100 and an intermediate circuit board 200.

The antenna device 100 may include an antenna dielectric layer 110 and an antenna unit layer 120 disposed on the antenna dielectric layer 110.

The antenna dielectric layer 110 may include a transparent resin film that may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In an embodiment, the antenna dielectric layer 110 may include a cycloolefin polymer (COP) layer for a stable formation of an antenna unit to be described later and a connection reliability with the intermediate circuit board 200.

The antenna dielectric layer 110 may include an adhesive material such as an optically clear adhesive (OCA) or an optically clear resin (OCR). In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The antenna unit layer 120 may include an antenna unit formed on a top surface of the antenna dielectric layer 110. For example, a plurality of the antenna units may be arranged along a width direction of the antenna device 100.

The antenna unit may include a first radiator 122 and a transmission line 124. The first radiator 122 may have, e.g., a polygonal plate shape, and the transmission line 124 may extend from one side of the first radiator 122. The transmission line 124 may be formed as a single member substantially integral with the first radiator 122, and may have a narrower width than that of the first radiator 122.

The antenna unit may further include a signal pad 126. The signal pad 126 may be connected to a terminal end portion of the transmission line 124. In an embodiment, the signal pad 126 may be provided as a member substantially integral with the transmission line 124, and the terminal end portion of the transmission line 124 may serve as the signal pad 126.

In some embodiments, a ground pad 128 may be disposed around the signal pad 126. For example, a pair of the ground pads 128 may be disposed to face each other with the signal pad 126 interposed therebetween. The ground pad 128 may be electrically and physically separated from the transmission line 124 and the signal pad 126.

The antenna unit or the first radiator 122 may be designed to have, e.g., a resonance frequency corresponding to a high frequency or an ultra-high frequency band such as 3G, 4G, 5G or higher bands. For example, the resonance frequency of the antenna unit may have a resonance frequency of about 10 GHz or more, or in a range from about 20 to 40 GHz.

The antenna unit may include silver (Ag), gold (Au), copper (Cu), aluminum (Al), platinum (Pt), palladium (Pd), chromium (Cr), titanium (Ti), tungsten (W), niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of at least two therefrom.

The antenna unit may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit may include a transparent conductive oxide such as indium tin oxide (ITO), indium zinc oxide (IZO), zinc oxide (ZnOx), indium zinc tin oxide (IZTO), etc.

In some embodiments, the antenna unit may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, the antenna unit may include a blackened portion, so that a reflectance at a surface of the antenna unit may be decreased to suppress a visual recognition of the antenna unit due to a light reflectance.

In an embodiment, a surface of the metal layer included in the antenna unit may be converted into a metal oxide or a metal sulfide to form a blackened layer. In an embodiment, a blackened layer such as a black material coating layer or a plating layer may be formed on the antenna unit or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, as illustrated in FIG. 1, the first radiator 122 and the transmission line 124 may include a mesh-pattern structure to improve transmittance. In this case, a dummy mesh pattern (not illustrated) may be formed around the first radiator 122 and the transmission line 124.

The signal pad 126 and the ground pad 128 may have a solid pattern structure formed of the above-described metal or alloy in consideration of reduction of a feeding resistance, noise absorption efficiency, improvement of horizontal radiation property, etc.

In an embodiment, the radiator 122 may have the mesh-pattern structure, and at least a portion of the transmission line 124 may include a solid metal pattern.

The first radiator 122 may be disposed in a display area of the image display device, and the signal pad 126 and the ground pad 128 may be disposed in a non-display area or a bezel area of the image display device. At least a portion of the transmission line 124 may also be disposed in the non-display area or the bezel area.

An antenna ground layer 130 may be formed on a bottom surface of the antenna dielectric layer 110. The antenna ground layer 130 may include the aforementioned metal and/or alloy.

In some embodiments, the antenna ground layer 130 may be included as an independent component of the antenna device 100. In some embodiments, a conductive member of the image display device on which the antenna device 100 is applied may serve as the antenna ground layer 130.

The conductive member may include, e.g., a gate electrode of a thin film transistor (TFT), various wirings such as a scan line or a data line, various electrodes such as a pixel electrode or a common electrode included in a display panel.

In an embodiment, various structures including a conductive material disposed under, e.g., the display panel may serve as the antenna ground layer 130. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the antenna ground layer 130.

The intermediate circuit board 200 may include a core layer 210 and a conductive layer 220 formed on one surface of the core layer 210. A ground layer 230 may be formed on the other surface of the core layer 210 opposite to the one surface.

The intermediate circuit board 200 may be fabricated from, e.g., a flexible printed circuit board (FPCB).

The core layer 210 may include a flexible resin. For example, the core layer 210 may include a flexible resin such as a polyimide resin, a modified polyimide (MPI), an epoxy resin, polyester, a cycloolefin polymer (COP), a liquid crystal polymer (LCP), or the like. The core layer 210 may include an internal insulating layer included in the intermediate circuit board 200.

Preferably, the core layer 210 may include the LCP or the MPI to provide sufficient flexible and bending properties.

The conductive layer 220 may include a first feeding wiring 222 electrically connected to the antenna unit layer 120. The first feeding wiring 222 may be connected to or bonded to the signal pad 126 of the antenna unit layer 120.

For example, one end portion of the first feeding wiring 222 may be exposed by partially removing a coverlay film (not illustrated) of the circuit board 200. The exposed one end portion of the first feeding wiring 222 may be bonded to the antenna unit layer 120 including the signal pad 126.

For example, the intermediate circuit board 200 and the antenna device 100 may be bonded to each other through a heat treatment/pressurization process utilizing a conductive bonding structure 150 such as an anisotropic conductive film (ACF).

The intermediate circuit board 200 or the core layer 210 may include a first region I, a second region II and a third region III. The first region I may be provided as a bonding region between the intermediate circuit board 200 and the antenna device 100.

In exemplary embodiments, the second region II may be located between the first region I and the third region III, and may serve as a bending region of the intermediate circuit board 200. For example, the intermediate circuit board 200 may be bent or folded by the second region II so that the third region III may be disposed under the display panel.

In this case, the second region II may be located on a lateral portion of the display panel.

In exemplary embodiments, the conductive layer 220 of the intermediate circuit board 200 may include a second radiator 224. The second radiator 224 may be formed on the one surface of the core layer 210 of the second region II. In some embodiments, the second radiator 224 may be formed at the same layer or at the same level as that of the first feeding wiring 222.

For example, a plurality of the second radiators 224 may be arranged along a width direction of the intermediate circuit board 200 in the second region II.

A second feeding wiring 226 may extend from one side of the second radiator 224. The second feeding wiring 226 may extend from one side of the second radiator 224, and may extend throughout the second region II and the third region III.

In some embodiments, the conductive layer 220 of the intermediate circuit board 200 may further include a third radiator 223. The third radiator 223 may be formed on the one surface of the core layer 210 of the third region III. In some embodiments, the third radiator 223 may be formed at the same layer or at the same level as that of the first feeding wiring 222.

For example, a plurality of the third radiators 223 may be arranged along the width direction of the intermediate circuit board 200 in the third region III.

A third feeding wiring 225 may extend from one side of the third radiator 223. The third feeding wiring 225 may extend from the one side of the third radiator 223 on the third region III.

According to the above-described exemplary embodiments, the first radiator 122 may be substantially serve as an AOD (Antenna-On Display) antenna unit. Accordingly, sufficient radiation properties and gain may be achieved from a front portion of an image display device through the first radiator 122. For example, a vertical radiation in a direction to the front portion of the image display device may be implemented through the first radiator 122.

The second radiator 224 and the third radiator 223 may serve as an antenna unit substantially integrated with the intermediate circuit board 200. Accordingly, while feeding and signal control of the AOD antenna unit are performed by the intermediate circuit board 200, an auxiliary antenna radiation may be implemented. The core layer 210 of the intermediate circuit board 200 may be substantially serve as an antenna dielectric layer for the second radiator 224 and the third radiator 223.

For example, a horizontal radiation in a lateral direction of the image display device may be implemented through the second radiator 224, and a vertical radiation in a rear direction of the image display device may be implemented through the third radiator 223.

Accordingly, an antenna radiation coverage provided from the image display device may be extended utilizing the intermediate circuit board 200. Additionally, the horizontal radiation and the rear vertical radiation through the second radiator 224 and the third radiator 223 may be easily implemented by bending of the intermediate circuit board 200 having relatively improved flexibility.

In some embodiments, the second radiator 224 and the third radiator 223 may be disposed at a peripheral portion (or a bezel portion) and a rear portion of the image display device, respectively, as the intermediate circuit board 200 is bent. Thus, the second radiator 224 and the third radiator 223 may not be visually recognized by a user, and thus may be formed of a solid metal pattern, thereby improving a signal efficiency by a low resistance.

As described above, the first radiator 122 may be provided as an AOD antenna pattern. Accordingly, the first radiator 122 may be formed in a mesh-pattern structure to increase transmittance and prevent a visual recognition by the user.

The ground layer 230 may be formed on the bottom surface of the core layer 210 throughout the first region I, the second region II and the third region III. The ground layer 230 may cover the first to third feeding wirings 222, 226 and 225 in a planar view to promote feeding and signaling to the first to third radiators 122, 224 and 223 by a formation of an electric field.

The ground layer 230 may also overlap the second radiator 224 and the third radiator 223 in a thickness direction or in the planar view to induce the antenna radiation from the intermediate circuit board 200.

The conductive layer 220 and the ground layer 230 of the intermediate circuit board 200 may include the above-described metal or alloy. For example, the conductive layer 210 and the ground layer 230 may be fabricated from a metal layer included on one surface and the other surface of a copper clad laminate. For example, the first to third feeding wirings 222, 226 and 225, the second radiator 224 and the third radiator 223 may be formed by etching the metal layer formed on the one surface of the copper clad laminate.

As illustrated in FIG. 2, the intermediate circuit board 200 may be electrically connected to a chip mounting board 300.

For example, terminal end portions of the first to third feeding wirings 222, 226 and 225 may be electrically connected to the connection wirings 330 included in the chip mounting board 300 through a connector 320.

An antenna driving integrated circuit (IC) chip 340 may be mounted on the chip mounting board 300 using a surface mounting technology (SMT) to be electrically connected to the connection wirings 330. Accordingly, feeding and applying a control signal (e.g., a phase signal, a beam tilting signal, etc.) may be performed to the first to third radiators 122, 224 and 223 through the antenna driving IC chip 340.

The chip mounting board 300 may include, e.g., a main board, a package board, or a rigid printed circuit board. The chip mounting board 300 may include an insulating body 310 on which the connector 320, the connection wiring 330 and the antenna driving integrated circuit (IC) chip 340 are disposed. The insulating body 310 may include, e.g., a resin impregnated with an inorganic material such as glass fiber (e.g., a prepreg), and may have higher rigidity or lower flexibility than that of the core layer 210.

Figure 3:
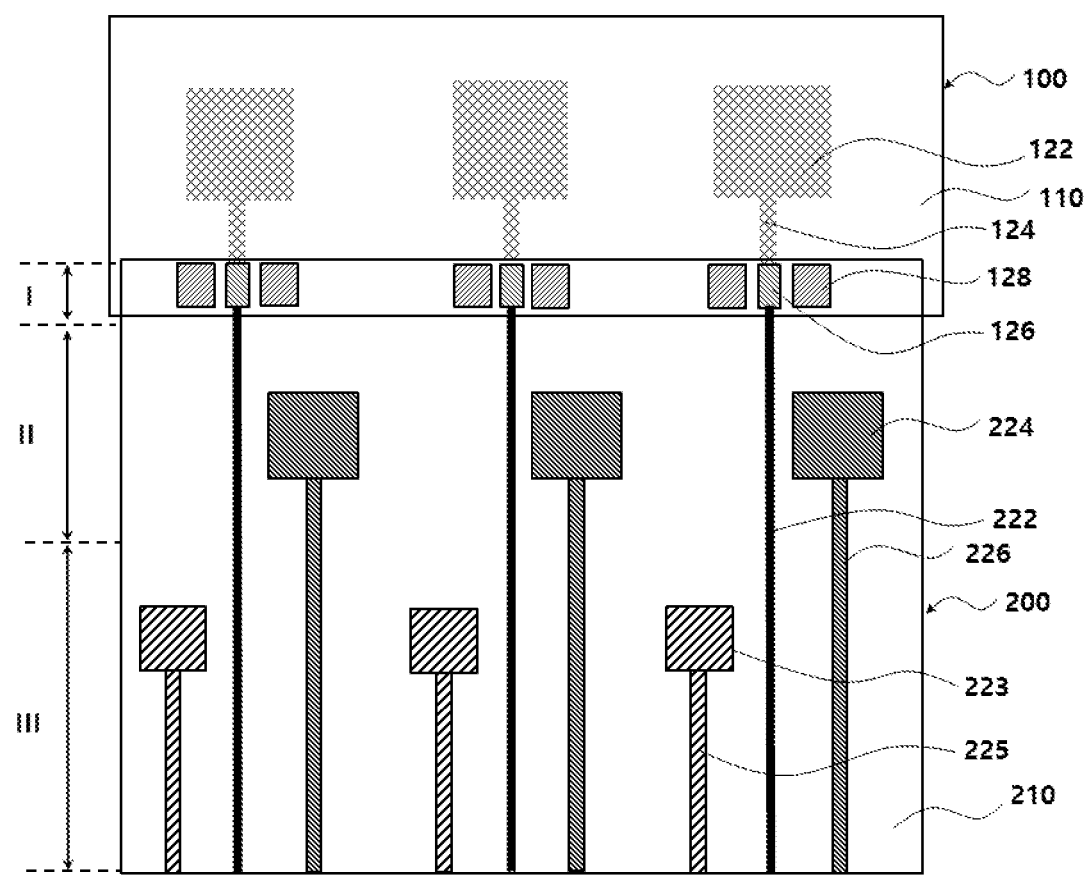
FIG. 3 is a schematic top planar view illustrating an antenna package in accordance with some exemplary embodiments.

FIG. 3 is a schematic top planar view illustrating an antenna package in accordance with some exemplary embodiments. Detailed descriptions of elements and structures substantially the same as or similar to those described with reference to FIGS. 1 and 2 are be omitted herein.

Referring to FIG. 3, the antenna package may include radiators having different sizes and/or resonance frequencies. For example, the first to third radiators 122, 224 and 223 may have different sizes.

In an embodiment, the first radiator 122 having a relatively long signal path through the first feeding wiring 222 may have a relatively low resonance frequency and a large size to prevent degradation of radiation reliability due to a signal loss.

In an embodiment, the third radiator 223 having a short signal path through the third feeding wiring 225 may have a relatively high frequency and a small size.

For example, the first radiator 122, the second radiator 224 and the third radiator 223 may have sequentially decreasing sizes. For example, in a range from 10 GHz to 40

GHz, the first radiator 122, the second radiator 224 and the third radiator 223 may have resonant frequencies that may sequentially increase.

Figure 4:
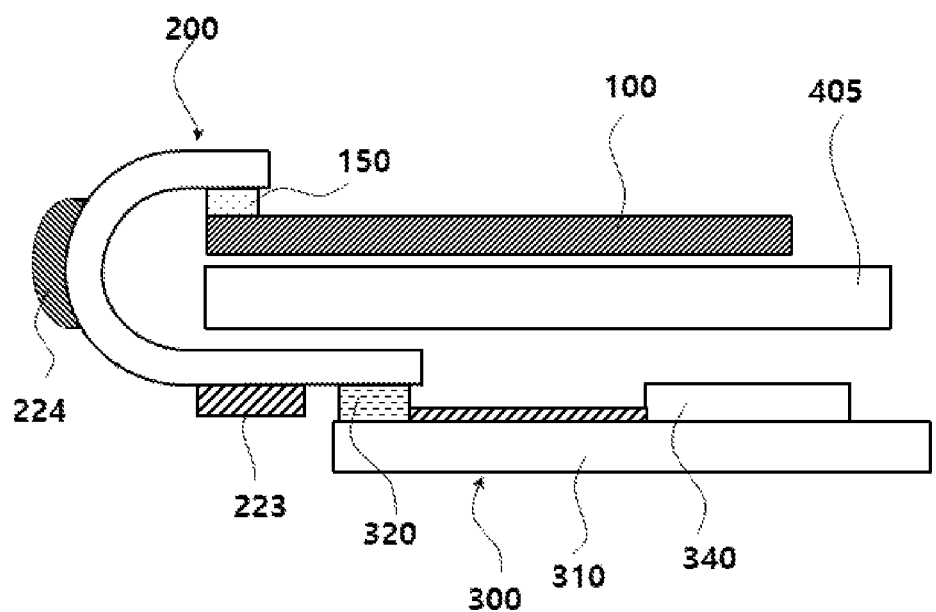
FIGS. 4 and 5 are a schematic cross-sectional view and a schematic top planar view, respectively, illustrating an image display device in accordance with exemplary embodiments.
Figure 5:
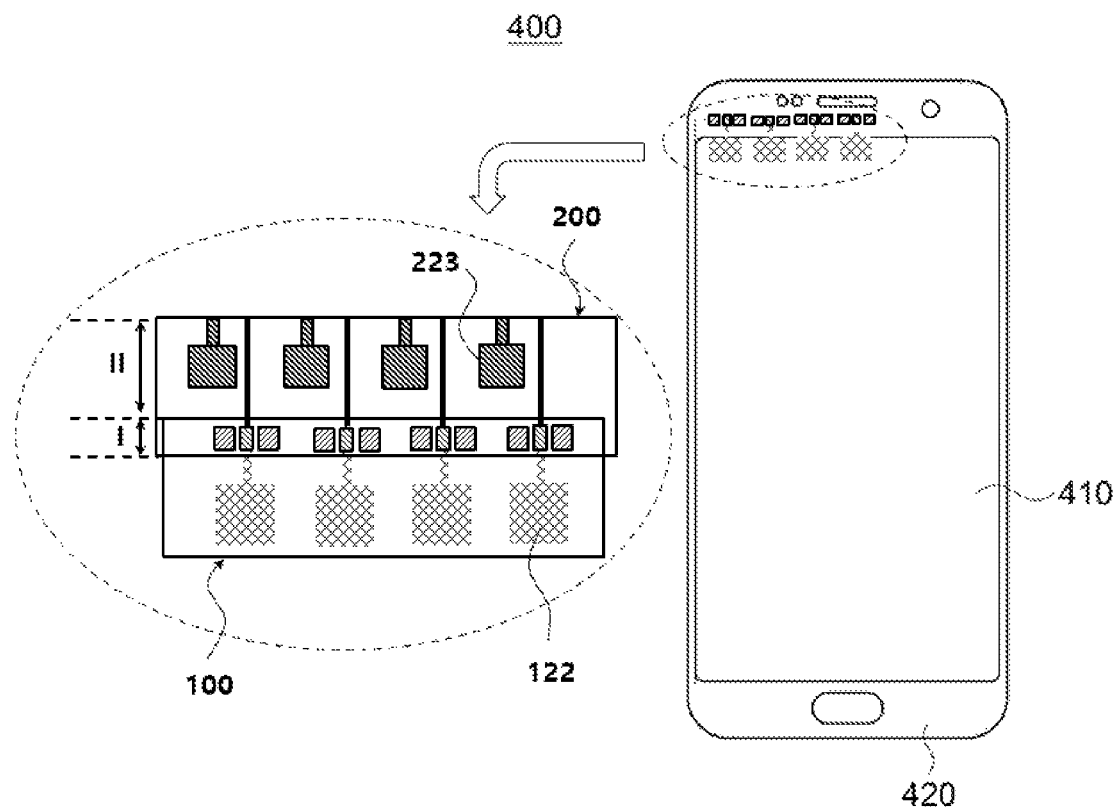

FIGS. 4 and 5 are a schematic cross-sectional view and a schematic top planar view, respectively, illustrating an image display device in accordance with exemplary embodiments. For convenience of descriptions, illustrations of some elements of the antenna device 100 and the intermediate circuit board 200 are omitted. For example, an illustration of the feeding wiring in the conductive layer 220 of the intermediate circuit board 200 is omitted. In FIG. 5, the second region II of the intermediate circuit board 200 is shown in a flat state before being bent.

Referring to FIGS. 4 and 5, an image display device 400 may be fabricated in the form of, e.g., a smart phone, and FIG. 5 illustrates a front portion or a window surface of the image display device 400. The front portion of the image display device 400 may include a display area 410 and a peripheral area 420. The peripheral area 420 may correspond to, e.g., a light-shielding portion or a bezel portion of the image display device.

The antenna device 100 included in the above-described antenna package may be disposed toward the front portion of the image display device 400, and may be disposed on, e.g., the display panel 405. In an embodiment, the first radiator 122 may be at least partially disposed in the display area 410.

In this case, the first radiator 122 may include a mesh-pattern structure, and a reduction of transmittance due to the first radiator 122 may be prevented. The pads 126 and 128 included in the antenna unit may be formed of a solid metal pattern, and may be disposed in the peripheral area 420 to prevent degradation of an image quality.

In some embodiments, the intermediate circuit board 200 may be bent and disposed on a rear portion of the image display device 400 to extend toward the chip mounting board 300 on which the antenna driving IC chip 340 is mounted.

As described above, the first region I of the intermediate circuit board 200 may be bonded to the antenna device 100, and the second region II may be bent to be disposed on, e.g., a lateral portion of the display panel 405. The second radiator 224 may be disposed on the lateral portion of the display panel 405 to provide the horizontal radiation. For example, the second radiator 224 may have a curved shape.

The third region III of the intermediate circuit board 200 may be located under the display panel 405 or at the rear portion of the image display device. For example, the third region III may face the antenna device 100.

Accordingly, the third radiator 223 may be provided as a vertical radiator at the rear portion. Therefore, radiation may be provided together in the front, rear and lateral directions of the image display device so that an antenna coverage may be expanded.

What is claimed is:

1. An antenna package, comprising:
   an antenna device comprising an antenna unit that includes a first radiator; and
   an intermediate circuit board coupled to the antenna device to be electrically connected to the antenna unit, the intermediate circuit board comprising:
   a core layer;
   a first feeding wiring formed on one surface of the core layer and electrically connected to the antenna unit; and
   a second radiator formed on the one surface of the core layer, and
   a third radiator formed on the one surface of the core layer,
   wherein the core layer has a first region bonded to the antenna device, a second region having a bending region and a third region having an end portion of the intermediate circuit board, and
   the second radiator is formed on the second region of the core layer, and the third radiator is formed on the third region of the core layer.

2. The antenna package of claim 1, wherein the intermediate circuit board further comprises a second feeding wiring extending from the second radiator on the one surface of the core layer.

3. The antenna package of claim 2, wherein the intermediate circuit board further comprises a third feeding wiring extending from the third radiator on the one surface of the core layer.

4. The antenna package of claim 1, wherein the second radiator serves as a horizontal radiator with respect to the antenna device, and
   the third radiator serves as a vertical radiator in a bottom surface direction of the antenna device.

5. The antenna package of claim 4, wherein the first radiator is a vertical radiator in a top surface direction of the antenna device.

6. The antenna package of claim 3, wherein the second feeding wiring extends from the second radiator on the second region and the third region, and
   the third feeding wiring extends from the third radiator on the third region.

7. The antenna package of claim 1, wherein the first radiator has a different size or a different resonance frequency from that of the second radiator or the third radiator.

8. The antenna package of claim 7, wherein the first radiator, the second radiator and the third radiator have sizes that sequentially decrease.

9. The antenna package of claim 7, wherein the first radiator, the second radiator and the third radiator have resonance frequencies that sequentially increase.

10. The antenna package of claim 3, further comprising an antenna driving integrated circuit chip electrically connected to the first feeding wiring, the second feeding wiring and the third feed wiring by the third region of the core layer.

11. The antenna package of claim 3, wherein the first feeding wiring, the second feeding wiring, the third feeding wiring, the second radiator and the third radiator are formed together at the same layer on the one surface of the core layer.

12. The antenna package of claim 1, wherein the second radiator has a curved shape.

13. An image display device, comprising:
    a display panel; and
    the antenna package of claim 1 disposed on the display panel.

14. The image display device of claim 13, further comprising a chip mounting board disposed under the display panel, and an antenna driving integrated circuit chip mounted on the chip mounting board,
    wherein the intermediate circuit board of the antenna package is bent under the display panel to be coupled to the chip mounting board and electrically connected to the antenna driving integrated circuit chip.

15. The image display device of claim 14, wherein the second radiator is disposed on a lateral portion of the display panel.

16. The image display device of claim 15, wherein the intermediate circuit board further comprises a third radiator formed on the one surface of the core layer and disposed under the display panel.

\* \* \* \* \*